US012051808B2

(12) United States Patent
Ishii et al.

(10) Patent No.: US 12,051,808 B2
(45) Date of Patent: Jul. 30, 2024

(54) COMPOSITION FOR NON-AQUEOUS SECONDARY BATTERY FUNCTIONAL LAYER, NON-AQUEOUS SECONDARY BATTERY MEMBER, AND NON-AQUEOUS SECONDARY BATTERY

(71) Applicant: ZEON CORPORATION, Tokyo (JP)

(72) Inventors: Hidetake Ishii, Tokyo (JP); Norikazu Yamamoto, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 930 days.

(21) Appl. No.: 17/041,444

(22) PCT Filed: Apr. 2, 2019

(86) PCT No.: PCT/JP2019/014674
§ 371 (c)(1),
(2) Date: Sep. 25, 2020

(87) PCT Pub. No.: WO2019/194194
PCT Pub. Date: Oct. 10, 2019

(65) Prior Publication Data
US 2021/0119214 A1    Apr. 22, 2021

(30) Foreign Application Priority Data

Apr. 3, 2018 (JP) ................................. 2018-071840

(51) Int. Cl.
H01M 4/62      (2006.01)
C08K 3/34      (2006.01)
C08K 3/36      (2006.01)
C08L 53/02     (2006.01)
H01M 4/02      (2006.01)
H01M 10/0525   (2010.01)
H01M 50/409    (2021.01)
H01M 50/443    (2021.01)

(52) U.S. Cl.
CPC ............. H01M 4/622 (2013.01); C08K 3/346 (2013.01); C08K 3/36 (2013.01); C08L 53/02 (2013.01); H01M 4/628 (2013.01); H01M 10/0525 (2013.01); H01M 50/409 (2021.01); H01M 50/443 (2021.01); C08K 2201/001 (2013.01); C08K 2201/003 (2013.01); H01M 2004/021 (2013.01)

(58) Field of Classification Search
CPC ............................................ H01M 2300/0017
See application file for complete search history.

(56) References Cited

U.S. PATENT DOCUMENTS

| | | | |
|---|---|---|---|
| 10,312,521 B2 | 6/2019 | Toyoda et al. | |
| 2008/0026294 A1* | 1/2008 | Jiang | H01M 4/5815 429/246 |
| 2009/0075199 A1* | 3/2009 | Lungu | B41N 1/12 430/281.1 |
| 2010/0248026 A1 | 9/2010 | Hinoki et al. | |
| 2011/0159362 A1* | 6/2011 | Wakizaki | H01G 9/02 521/139 |
| 2012/0318424 A1* | 12/2012 | Lopitaux | B60C 1/0016 152/526 |
| 2015/0030933 A1 | 1/2015 | Goetzen et al. | |
| 2015/0086875 A1 | 3/2015 | Yoshida | |
| 2016/0104893 A1 | 4/2016 | Kazuaki et al. | |
| 2016/0206568 A1* | 7/2016 | Ogino | A61K 9/70 |
| 2019/0044147 A1* | 2/2019 | Yamamoto | H01M 10/0525 |
| 2019/0386336 A1* | 12/2019 | Sekimoto | H01M 10/058 |

FOREIGN PATENT DOCUMENTS

| | | | | |
|---|---|---|---|---|
| CN | 107004859 A | 8/2017 | | |
| EP | 3719893 A1 | 10/2020 | | |
| JP | 2010225545 A | 10/2010 | | |
| JP | 2012099251 A | 5/2012 | | |
| JP | 2015005526 A | 1/2015 | | |
| WO | 2011013604 A1 | 2/2011 | | |
| WO | 2017056404 A1 | 4/2017 | | |
| WO | WO-2017056404 A1 * | 4/2017 | ............ | C08L 101/00 |
| WO | WO-2018168661 A1 * | 9/2018 | ............ | C08F 297/04 |

OTHER PUBLICATIONS

Jun. 11, 2019, International Search Report issued in the International Patent Application No. PCT/JP2019/014674.
Dec. 16, 2021, the Extended European Search Report issued by the European Patent Office in the corresponding European Patent Application No. 19781857.8.
Oct. 6, 2020, International Preliminary Report on Patentability issued in the International Patent Application No. PCT/JP2019/014674.

* cited by examiner

Primary Examiner — Christopher M Rodd
(74) Attorney, Agent, or Firm — KENJA IP LAW PC

(57) ABSTRACT

Provided is a composition for a functional layer capable of forming a functional layer that can both inhibit post-cycling swelling of a secondary battery and increase charge carrier acceptance of the secondary battery at low temperatures. The composition for a functional layer contains non-conductive inorganic particles, a solvent, and a block copolymer including a block region formed of an aromatic vinyl monomer unit and a block region formed of either or both of an aliphatic conjugated diene monomer unit having a carbon number of 5 or more and a hydrogenated aliphatic conjugated diene monomer unit having a carbon number of 5 or more.

18 Claims, No Drawings

COMPOSITION FOR NON-AQUEOUS SECONDARY BATTERY FUNCTIONAL LAYER, NON-AQUEOUS SECONDARY BATTERY MEMBER, AND NON-AQUEOUS SECONDARY BATTERY

TECHNICAL FIELD

The present disclosure relates to a composition for a non-aqueous secondary battery functional layer, a non-aqueous secondary battery member, and a non-aqueous secondary battery.

BACKGROUND

Non-aqueous secondary batteries (hereinafter, also referred to simply as "secondary batteries") such as lithium ion secondary batteries have characteristics such as compact size, light weight, high energy-density, and the ability to be repeatedly charged and discharged, and are used in a wide variety of applications. A secondary battery typically includes non-aqueous secondary battery members (hereinafter, also referred to simply as "battery members") such as electrodes (positive electrode and negative electrode) and a separator that isolates the positive electrode and the negative electrode from each other.

A battery member of a secondary battery may be a member that includes a functional layer for a non-aqueous secondary battery (hereinafter, also referred to simply as a "functional layer") containing a binder and particles compounded in order to cause the battery member to display a desired function (hereinafter, referred to as "functional particles").

Specifically, a separator that includes a porous membrane layer containing a binder and non-conductive inorganic particles as functional particles on a separator substrate may be used as a separator of a secondary battery. Moreover, an electrode that includes an electrode mixed material layer containing a binder and electrode active material particles as functional particles on a current collector or an electrode that further includes a porous membrane layer such as described above on an electrode substrate including an electrode mixed material layer on a current collector may be used as an electrode of a secondary battery.

In recent years, attempts have been made to improve compositions used in functional layer formation (hereinafter, such a composition is also referred to as a "composition for a non-aqueous secondary battery functional layer", or simply as a "composition for a functional layer") in order to achieve further improvement of secondary battery performance (for example, refer to Patent Literature (PTL) 1).

PTL 1 describes a slurry composition for a non-aqueous secondary battery electrode that contains electrode active material particles, a particulate polymer A having a volume-average particle diameter of not less than 0.6 µm and not more than 2.5 µm, and a particulate polymer B having a volume-average particle diameter of not less than 0.01 µm and not more than 0.5 µm, and in which the proportional content of the particulate polymer A is more than 30 mass % and not more than 90 mass % of the total content of the particulate polymer A and the particulate polymer B. According to PTL 1, peel strength of an electrode can be increased and a secondary battery can be caused to display excellent cycle characteristics by using this slurry composition to form an electrode mixed material layer.

CITATION LIST

Patent Literature

PTL 1: WO2017/056404A1

SUMMARY

Technical Problem

In order to enhance battery characteristics (output characteristics, etc.) at low temperatures, it is desirable for electrode active material particles in a secondary battery to accept charge carriers such as lithium ions well under low-temperature conditions (i.e., have excellent charge carrier acceptance at low temperatures). Moreover, secondary batteries suffer from a problem of swelling after repeated charging and discharging (cycling), and there is demand for inhibiting such post-cycling swelling.

Accordingly, one object of the present disclosure is to provide a composition for a non-aqueous secondary battery functional layer capable of forming a functional layer that can both inhibit post-cycling swelling of a non-aqueous secondary battery and increase charge carrier acceptance of the non-aqueous secondary battery at low temperatures.

Another object of the present disclosure is to provide a non-aqueous secondary battery member including a functional layer that can both inhibit post-cycling swelling of a non-aqueous secondary battery and increase charge carrier acceptance of the non-aqueous secondary battery at low temperatures.

Yet another object of the present disclosure is to provide a non-aqueous secondary battery in which post-cycling swelling is inhibited and that has excellent charge carrier acceptance at low temperatures.

Solution to Problem

The inventors conducted diligent investigation with the aim of solving the problems set forth above. The inventors discovered that it is possible to form a functional layer that can both inhibit post-cycling swelling of a non-aqueous secondary battery and increase charge carrier acceptance of the non-aqueous secondary battery at low temperatures by using a composition for a functional layer that contains a specific block copolymer, non-conductive inorganic particles, and a solvent. In this manner, the inventors completed the present disclosure.

Specifically, the present disclosure aims to advantageously solve the problems set forth above, and a presently disclosed composition for a non-aqueous secondary battery functional layer comprises: a block copolymer including a block region formed of an aromatic vinyl monomer unit and a block region formed of either or both of an aliphatic conjugated diene monomer unit having a carbon number of 5 or more and a hydrogenated aliphatic conjugated diene monomer unit having a carbon number of 5 or more; non-conductive inorganic particles; and a solvent. By forming a functional layer using a composition for a functional layer containing non-conductive inorganic particles, a solvent, and a block copolymer including a block region formed of an aromatic vinyl monomer unit and a block region formed of an aliphatic conjugated diene monomer unit having a carbon number of 5 or more and/or a hydrogenated aliphatic conjugated diene monomer unit having a carbon number of 5 or more in this manner, a battery member that includes the functional layer can both inhibit post-cycling swelling of a secondary battery and increase charge carrier acceptance of the secondary battery at low temperatures.

Note that a "monomer unit" of a polymer referred to in the present disclosure is a "repeating unit derived from the monomer that is included in a polymer obtained using the monomer".

Moreover, a "hydrogenated monomer unit" of a polymer referred to in the present disclosure is a "repeating unit obtained through hydrogenation of a monomer unit derived from the monomer".

Furthermore, when a block copolymer is said to "include a block region formed of an aromatic vinyl monomer unit" in the present disclosure, this means that "a section where only aromatic vinyl monomer units are bonded to one another in a row as repeating units is present in the block copolymer".

Also, when a block copolymer is said to "include a block region formed of either or both of an aliphatic conjugated diene monomer unit having a carbon number of 5 or more and a hydrogenated aliphatic conjugated diene monomer unit having a carbon number of 5 or more" in the present disclosure, this means that "a section where only either or both of aliphatic conjugated diene monomer units having a carbon number of 5 or more and hydrogenated aliphatic conjugated diene monomer units having a carbon number of 5 or more are bonded to one another in a row as repeating units is present in the block copolymer".

Moreover, the term "non-conductive inorganic particles" as used in the present disclosure refers to inorganic particles having an electrical conductivity of $10^{-2}$ S/m or less. Note that the electrical conductivity of inorganic particles referred to in the present disclosure can be calculated by measuring the volume resistivity in accordance with JIS H0505, and taking the reciprocal of the measured volume resistivity.

In the presently disclosed composition for a non-aqueous secondary battery functional layer, proportional content of the aromatic vinyl monomer unit in the block copolymer is preferably not less than 10 mass % and not more than 50 mass %. By using a block copolymer for which the proportional content of an aromatic vinyl monomer unit is within the range set forth above, post-cycling swelling of a secondary battery can be further inhibited.

Note that the "proportional content (mass %)" of each repeating unit in a polymer such as a block copolymer referred to in the present disclosure can be measured by a nuclear magnetic resonance (NMR) method such as $^1$H-NMR.

In the presently disclosed composition for a non-aqueous secondary battery functional layer, the non-conductive inorganic particles preferably include non-conductive inorganic particles A having a volume-average particle diameter of 1.0 μm or more. By using non-conductive inorganic particles A having a volume-average particle diameter that is not less than the value set forth above as the non-conductive inorganic particles, charge carrier acceptance of a secondary battery at low temperatures can be further improved.

Note that the "volume-average particle diameter" of non-conductive inorganic particles referred to in the present disclosure can be measured by a method described in the EXAMPLES section of the present specification.

In the presently disclosed composition for a non-aqueous secondary battery functional layer, the non-conductive inorganic particles A are preferably either or both of silica and talc. By using silica and/or talc as the non-conductive inorganic particles A, charge carrier acceptance of a secondary battery at low temperatures can be even further improved.

In the presently disclosed composition for a non-aqueous secondary battery functional layer, it is preferable that the silica has a D25/D75 of not less than 0.30 and not more than 1.00, where D25 and D75 are particle diameters respectively corresponding to cumulative volumes of 25% and 75% from a small particle end in a particle diameter distribution of the silica, and that the silica has a volume-average particle diameter of not less than 16.0 μm and not more than 20.0 μm. By using silica having a D25/D75 and a volume-average particle diameter that are within the ranges set forth above, charge carrier acceptance of a secondary battery at low temperatures can be particularly improved while also inhibiting the formation of streaks during application of the composition for a functional layer onto a substrate.

Note that "D25/D75" of non-conductive inorganic particles referred to in the present disclosure can be measured by a method described in the EXAMPLES section of the present specification.

In the presently disclosed composition for a non-aqueous secondary battery functional layer, it is preferable that the talc has a D25/D75 of not less than 0.20 and not more than 1.00, where D25 and D75 are particle diameters respectively corresponding to cumulative volumes of 25% and 75% from a small particle end in a particle diameter distribution of the talc, and that the talc has a volume-average particle diameter of not less than 4.0 μm and not more than 6.0 μm. By using talc having a D25/D75 and a volume-average particle diameter that are within the ranges set forth above, charge carrier acceptance of a secondary battery at low temperatures can be particularly improved while also inhibiting the formation of streaks during application of the composition for a functional layer onto a substrate.

The presently disclosed composition for a non-aqueous secondary battery functional layer preferably comprises not less than 0.05 parts by mass and not more than 1.50 parts by mass of the non-conductive inorganic particles A per 100 parts by mass of the block copolymer. By using a composition for a functional layer that contains the non-conductive inorganic particles A in an amount that is within the range set forth above, it is possible to both further inhibit post-cycling swelling of a secondary battery and further increase charge carrier acceptance of the secondary battery at low temperatures.

In the presently disclosed composition for a non-aqueous secondary battery functional layer, the non-conductive inorganic particles can further include non-conductive inorganic particles B having a volume-average particle diameter of less than 1.0 μm. By forming a porous membrane layer using a composition for a functional layer that contains non-conductive inorganic particles B having a volume-average particle diameter of less than 1.0 μm in addition to the non-conductive inorganic particles A set forth above that have a volume-average particle diameter of 1.0 μm or more (i.e., by using the composition for a functional layer as a slurry composition for a non-aqueous secondary battery porous membrane layer), this enables good formation of a porous membrane layer that has excellent heat resistance and strength and that can inhibit post-cycling swelling of a secondary battery and improve charge carrier acceptance of the secondary battery at low temperatures.

In the presently disclosed composition for a non-aqueous secondary battery functional layer, the non-conductive inorganic particles B can be at least one selected from the group consisting of alumina, boehmite, silicon oxide, magnesia, calcium oxide, titania, $BaTiO_3$, ZrO, alumina-silica complex oxide, aluminum nitride, boron nitride, silicon, diamond, barium sulfate, calcium fluoride, barium fluoride, and montmorillonite. By forming a porous membrane layer using at least one of the examples set forth above as the non-conductive inorganic particles B, this enables good formation of a porous membrane layer that has excellent heat resistance and strength and that can inhibit post-cycling swelling of a secondary battery and improve charge carrier acceptance of the secondary battery at low temperatures.

The presently disclosed composition for a non-aqueous secondary battery functional layer can further comprise electrode active material particles. By forming an electrode mixed material layer using the composition for a functional layer containing electrode active material particles (i.e., by using the composition for a functional layer as a slurry composition for a non-aqueous secondary battery electrode), this enables good formation of an electrode mixed material layer that can inhibit post-cycling swelling of a secondary battery and improve charge carrier acceptance of the secondary battery at low temperatures.

Moreover, the present disclosure aims to advantageously solve the problems set forth above, and a presently disclosed non-aqueous secondary battery member comprises a functional layer for a non-aqueous secondary battery formed using any one of the compositions for a non-aqueous secondary battery functional layer set forth above. Through a battery member that includes a functional layer formed from the composition for a functional layer set forth above, it is possible to both inhibit post-cycling swelling of a secondary battery and increase charge carrier acceptance of the secondary battery at low temperatures.

Furthermore, the present disclosure aims to advantageously solve the problems set forth above, and a presently disclosed non-aqueous secondary battery comprises the non-aqueous secondary battery member set forth above. A secondary battery that includes the battery member set forth above has excellent charge carrier acceptance at low temperatures, and post-cycling swelling thereof is inhibited.

Advantageous Effect

According to the present disclosure, it is possible to provide a composition for a non-aqueous secondary battery functional layer capable of forming a functional layer that can both inhibit post-cycling swelling of a non-aqueous secondary battery and increase charge carrier acceptance of the non-aqueous secondary battery at low temperatures.

Moreover, according to the present disclosure, it is possible to provide a non-aqueous secondary battery member including a functional layer that can both inhibit post-cycling swelling of a non-aqueous secondary battery and increase charge carrier acceptance of the non-aqueous secondary battery at low temperatures.

Furthermore, according to the present disclosure, it is possible to provide a non-aqueous secondary battery in which post-cycling swelling is inhibited and that has excellent charge carrier acceptance at low temperatures.

DETAILED DESCRIPTION

The following provides a detailed description of embodiments of the present disclosure.

The presently disclosed composition for a non-aqueous secondary battery functional layer is a composition that can be used in production of a functional layer (for example, an electrode mixed material layer or a porous membrane layer) having a function such as giving and receiving electrons, reinforcement, or adhesion inside a non-aqueous secondary battery. Moreover, the presently disclosed non-aqueous secondary battery member includes a functional layer formed from the presently disclosed composition for a non-aqueous secondary battery functional layer. Furthermore, the presently disclosed non-aqueous secondary battery includes the presently disclosed non-aqueous secondary battery member.

(Composition for Non-Aqueous Secondary Battery Functional Layer)

The presently disclosed composition for a functional layer contains: a block copolymer including a block region formed of an aromatic vinyl monomer unit (hereinafter, also referred to simply as an "aromatic vinyl block region") and a block region formed of either or both of an aliphatic conjugated diene monomer unit having a carbon number of 5 or more and a hydrogenated aliphatic conjugated diene monomer unit having a carbon number of 5 or more (hereinafter, also referred to simply as a "(hydrogenated) C5 or higher aliphatic conjugated diene block region"); non-conductive inorganic particles; and a solvent, and optionally further contains other components that can be compounded in a functional layer of a secondary battery.

The presently disclosed composition for a functional layer containing the above-described block copolymer that functions as a binder, non-conductive inorganic particles, and a solvent can be used in that form to form a porous membrane layer as a functional layer, or can further contain electrode active material particles so that it can be used to form an electrode mixed material layer as a functional layer.

As a result of the presently disclosed composition for a functional layer containing the above-described block copolymer and non-conductive inorganic particles in a solvent, a battery member that can inhibit post-cycling swelling of a secondary battery while also improving charge carrier acceptance of the secondary battery at low temperatures can be obtained by forming a functional layer using the composition for a functional layer. Although it is not clear why inhibition of post-cycling swelling of a secondary battery and improvement of charge carrier acceptance of the secondary battery at low temperatures can be achieved by forming a functional layer of a battery member using the composition for a functional layer containing the specific block copolymer and specific non-conductive inorganic particles in a solvent in this manner, the reasons for this are presumed to be as follows.

Firstly, the aromatic vinyl block region included in the block copolymer adopts a pseudo cross-linked structure in a functional layer as a result of such regions being attracted to one another, and thus the aromatic vinyl block region enables strong adhesion of battery members via the functional layer and contributes to inhibition of swelling of a secondary battery after cycling. On the other hand, the (hydrogenated) C5 or higher aliphatic conjugated diene block region included in the block copolymer is composed of only an aliphatic conjugated diene monomer unit having a carbon number of 5 or more and/or a hydrogenated aliphatic conjugated diene monomer unit having a carbon number of 5 or more, which have excellent binding capacity, and thus imparts adhesiveness to a functional layer and contributes to inhibiting swelling of a secondary battery after cycling in the same way as the aromatic vinyl block region described above, while, on the other hand, also having excellent flexibility. As a result of the block copolymer including a region having excellent flexibility in this manner, the shape of the block copolymer can readily track an adhesion target that is adjacent thereto and the block copolymer can display good properties as a binder. However, as a result of the block copolymer that serves as a binder having flexibility, the block copolymer may be excessively squashed during pressing of a functional layer (for example, pressing of an electrode with the aim of densifying an electrode mixed material layer or compression of a cell with the aim of improving secondary battery energy density). Excessive squashing of the block copolymer may cause the block copolymer to cover the surfaces of electrode active material particles to a greater degree than is necessary and may block paths for migration of charge carriers inside the functional layer, for example, leading to reduction of charge carrier acceptance at low temperatures.

However, the presently disclosed composition for a functional layer contains non-conductive inorganic particles in addition to the block copolymer described above. The non-conductive inorganic particles have a comparatively low tendency to deform even during pressing of a functional layer. Consequently, by forming a functional layer using a composition for a functional layer that contains not only the block copolymer, but also non-conductive inorganic particles, the non-conductive inorganic particles can contribute to inhibiting excessive squashing of the block copolymer even in a situation in which the functional layer is pressed.

For these reasons, the presently disclosed composition for a functional layer containing the block copolymer described above and non-conductive inorganic particles is thought to inhibit post-cycling swelling of a secondary battery by enabling strong adhesion of battery members via a functional layer while also sufficiently ensuring charge carrier acceptance of the secondary battery at low temperatures by inhibiting excessive squashing of the block copolymer serving as a binder.

<Block Copolymer>

The block copolymer includes an aromatic vinyl block region and a (hydrogenated) C5 or higher aliphatic conjugated diene block region. The block copolymer may optionally include a macromolecule chain section where repeating units other than an aromatic vinyl monomer unit, an aliphatic conjugated diene monomer unit having a carbon number of 5 or more, and a hydrogenated aliphatic conjugated diene monomer unit having a carbon number of 5 or more are linked (hereinafter, also referred to simply as the "other region").

Note that the block copolymer may include just one aromatic vinyl block region or a plurality of aromatic vinyl block regions, may include just one (hydrogenated) C5 or higher aliphatic conjugated diene block region or a plurality of (hydrogenated) C5 or higher aliphatic conjugated diene block regions, and may include just one other region or a plurality of other regions.

<<Aromatic Vinyl Block Region>>

The aromatic vinyl block region is a region that only includes an aromatic vinyl monomer unit as a repeating unit.

A single aromatic vinyl block region may be formed of just one type of aromatic vinyl monomer unit or may be formed of a plurality of types of aromatic vinyl monomer units, but is preferably formed of just one type of aromatic vinyl monomer unit.

Moreover, a single aromatic vinyl block region may include a coupling moiety (i.e., aromatic vinyl monomer units forming a single aromatic vinyl block region may be linked to one another with a coupling moiety interposed therebetween).

In a case in which the block copolymer includes a plurality of aromatic vinyl block regions, the types and proportions of aromatic vinyl monomer units forming these aromatic vinyl block regions may be the same or different for each of the aromatic vinyl block regions, but are preferably the same.

Examples of aromatic vinyl monomers that can form an aromatic vinyl monomer unit of the aromatic vinyl block region in the block copolymer include styrene, styrene sulfonic acid and salts thereof, α-methylstyrene, p-t-butyl styrene, butoxystyrene, vinyltoluene, chlorostyrene, and vinylnaphthalene. Of these aromatic vinyl monomers, styrene is preferable. Although one of these aromatic vinyl monomers may be used individually or two or more of these aromatic vinyl monomers may be used in combination, it is preferable that one of these aromatic vinyl monomers is used individually.

Note that in the present disclosure, a compound corresponding to an "aromatic vinyl monomer" is considered to not correspond to an "acidic group-containing monomer" described further below.

The proportion constituted by an aromatic vinyl monomer unit in the block copolymer when the amount of all repeating units in the block copolymer (inclusive of monomer units and hydrogenated monomer units, and also inclusive of repeating units of a graft portion in a case in which the block copolymer includes a graft portion; same applies below) is taken to be 100 mass % is preferably 10 mass % or more, more preferably 12 mass % or more, even more preferably 14 mass % or more, and particularly preferably 25 mass % or more, and is preferably 50 mass % or less, more preferably 40 mass % or less, and even more preferably 35 mass % or less. When the proportion constituted by an aromatic vinyl monomer unit in the block copolymer is 10 mass % or more, battery members can be more strongly adhered via a functional layer, and post-cycling swelling of a secondary battery can be further inhibited. On the other hand, when the proportion constituted by an aromatic vinyl monomer unit in the block copolymer is 50 mass % or less, the block copolymer is not excessively rigid and, in a situation in which pressing of a functional layer is performed, the shape of the block copolymer can track an adhesion target adjacent thereto to an extent that enables sufficient expression of a function as a binder. Consequently, battery members can be more strongly adhered via the functional layer, and post-cycling swelling of a secondary battery can be further inhibited.

Note that the proportion constituted by an aromatic vinyl monomer unit in the block copolymer is normally the same as the proportion constituted by the aromatic vinyl block region in the block copolymer.

<<(Hydrogenated) C5 or Higher Aliphatic Conjugated Diene Block Region>>

The (hydrogenated) C5 or higher aliphatic conjugated diene block region is a region that only includes an aliphatic conjugated diene monomer unit having a carbon number of 5 or more as a repeating unit, that only includes a hydrogenated aliphatic conjugated diene monomer unit having a carbon number of 5 or more as a repeating unit, or that only includes an aliphatic conjugated diene monomer unit having a carbon number of 5 or more and a hydrogenated aliphatic conjugated diene monomer unit having a carbon number of 5 or more as repeating units. (Hereinafter, "(hydrogenated) aliphatic conjugated diene monomer unit having a carbon number of 5 or more" may be used as a collective term for both an "aliphatic conjugated diene monomer unit having a carbon number of 5 or more" and a "hydrogenated aliphatic conjugated diene monomer unit having a carbon number of 5 or more".)

A single (hydrogenated) C5 or higher aliphatic conjugated diene block region may be formed of just one type of (hydrogenated) aliphatic conjugated diene monomer unit having a carbon number of 5 or more or may be formed of a plurality of types of (hydrogenated) aliphatic conjugated diene monomer units having a carbon number of 5 or more, but is preferably formed of just one type of (hydrogenated) aliphatic conjugated diene monomer unit having a carbon number of 5 or more.

Moreover, a single (hydrogenated) C5 or higher aliphatic conjugated diene block region may include a coupling moiety (i.e., (hydrogenated) aliphatic conjugated diene monomer units having a carbon number of 5 or more that form a single (hydrogenated) C5 or higher aliphatic conjugated diene block region may be linked to one another with a coupling moiety interposed therebetween).

In a case in which the block copolymer includes a plurality of (hydrogenated) C5 or higher aliphatic conjugated diene block regions, the types and proportions of (hydrogenated) aliphatic conjugated diene monomer units having a carbon number of 5 or more that form these (hydrogenated) C5 or higher aliphatic conjugated diene block regions may be the same or different for each of the (hydrogenated) C5 or higher aliphatic conjugated diene block regions, but are preferably the same.

Examples of aliphatic conjugated diene monomers having a carbon number of 5 or more that can form a (hydrogenated) aliphatic conjugated diene monomer unit having a carbon number of 5 or more of the (hydrogenated) C5 or higher aliphatic conjugated diene block region in the block copolymer include conjugated diene compounds having a carbon number of 5 or more such as isoprene, 2,3-dimethyl-1,3-butadiene, and 1,3-pentadiene. Of these aliphatic conjugated diene monomers, isoprene is preferable. Although one of these aliphatic conjugated diene monomers may be used individually or two or more of these aliphatic conjugated diene monomers may be used in combination, it is preferable that one of these aliphatic conjugated diene monomers is used individually.

The upper limit for the carbon number of a (hydrogenated) aliphatic conjugated diene monomer unit having a carbon number of 5 or more is not specifically limited, but the carbon number thereof is normally 7 or less.

The proportion constituted by a (hydrogenated) aliphatic conjugated diene monomer unit having a carbon number of 5 or more in the block copolymer when the amount of all repeating units in the block copolymer is taken to be 100 mass % is preferably 50 mass % or more, more preferably 60 mass % or more, and even more preferably 65 mass % or more, and is preferably 90 mass % or less, more preferably 88 mass % or less, even more preferably 86 mass % or less, and particularly preferably 75 mass % or less. When the proportion constituted by a (hydrogenated) aliphatic conjugated diene monomer unit having a carbon number of 5 or more in the block copolymer is 50 mass % or more, flexibility of the block copolymer is ensured and, in a situation in which pressing of a functional layer is performed, the shape of the block copolymer can track an adhesion target adjacent thereto to an extent that enables sufficient expression of a function as a binder. Consequently, battery members can be more strongly adhered via the functional layer, and post-cycling swelling of a secondary battery can be further inhibited. On the other hand, when the proportion constituted by a (hydrogenated) aliphatic conjugated diene monomer unit having a carbon number of 5 or more in the block copolymer is 90 mass % or less, battery members can be more strongly adhered via a functional layer, and post-cycling swelling of a secondary battery can be further inhibited.

Note that the proportion constituted by a (hydrogenated) aliphatic conjugated diene monomer unit having a carbon number of 5 or more in the block copolymer is normally the same as the proportion constituted by the (hydrogenated) C5 or higher aliphatic conjugated diene block region in the block copolymer.

<<Other Region>>

The other region is a region that is formed of a repeating unit other than an aromatic vinyl monomer unit, an aliphatic conjugated diene monomer unit having a carbon number of 5 or more, and a hydrogenated aliphatic conjugated diene monomer unit having a carbon number of 5 or more (hereinafter, also referred to simply as the "other repeating unit") as a repeating unit.

A single other region may be formed of one type of other repeating unit or may be formed of a plurality of types of other repeating units.

Moreover, a single other region may include a coupling moiety (i.e., other repeating units forming a single other region may be linked to one another with a coupling moiety interposed therebetween).

In a case in which the block copolymer includes a plurality of other regions, the types and proportions of other repeating units forming these other regions may be the same or different for each of the other regions.

[Acidic Group-Containing Monomer Unit]

The other repeating unit forming the other region of the block copolymer is not specifically limited and may, for example, be an acidic group-containing monomer unit.

Examples of acidic group-containing monomers that can form an acidic group-containing monomer unit include carboxyl group-containing monomers, sulfo group-containing monomers, and phosphate group-containing monomers.

Examples of carboxyl group-containing monomers include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, and α-chloro-β-E-methoxyacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid monoesters such as nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

Moreover, an acid anhydride that produces a carboxyl group through hydrolysis can also be used as a carboxyl group-containing monomer.

Examples of sulfo group-containing monomers include styrene sulfonic acid, vinyl sulfonic acid (ethylene sulfonic acid), methyl vinyl sulfonic acid, (meth)allyl sulfonic acid, and 3-allyloxy-2-hydroxypropane sulfonic acid.

Note that in the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

Note that in the present disclosure, "(meth)acryloyl" is used to indicate "acryloyl" and/or "methacryloyl".

One acidic group-containing monomer may be used individually to form an acidic group-containing monomer unit or two or more acidic group-containing monomers may be used in combination to form acidic group-containing monomer units. Of these acidic group-containing monomers, methacrylic acid, itaconic acid, and acrylic acid are more preferable, and methacrylic acid is even more preferable.

[Graft Portion]

The block copolymer may include a graft portion as the other region set forth above. In other words, the block copolymer may have a structure in which a polymer forming a graft portion is bonded to a polymer forming a backbone portion.

An acidic group-containing monomer unit such as described above is preferable as a repeating unit included in a graft portion of the block copolymer. An acidic group-containing monomer used to form the acidic group-containing monomer unit included in the graft portion of the block copolymer may be one acidic group-containing monomer used individually or two or more acidic group-containing monomers used in combination. Of acidic group-containing monomers, methacrylic acid, itaconic acid, and acrylic acid are more preferable, and methacrylic acid is even more preferable.

In a case in which the block copolymer includes a graft portion, the proportion constituted by the graft portion in the block copolymer when the amount of all repeating units in the block copolymer is taken to be 100 mass % is preferably 0.1 mass % or more, more preferably 0.5 mass % or more, and even more preferably 1 mass % or more, and is preferably 20 mass % or less, more preferably 18 mass % or less, and even more preferably 15 mass % or less.

<<Production Method of Block Copolymer>>

No specific limitations are placed on the method by which the block copolymer is produced. The block copolymer can be produced by, for example, polymerizing a first monomer component in the presence of an organic solvent to obtain a solution, adding a second monomer component, differing from the first monomer component, to the solution and polymerizing the second monomer component, and further repeating addition and polymerization of monomer components (block copolymerization) as necessary. The organic solvent used as a reaction solvent is not specifically limited and can be selected as appropriate depending on the types of monomers and so forth.

After performing block copolymerization as described above, it is preferable that the obtained polymer is subjected to a coupling reaction using a coupling agent. The coupling reaction can, for example, cause the terminals of diblock structures contained in the polymer to bond to each other through the coupling agent to thereby convert the diblock structures to a triblock structure.

Examples of coupling agents that can be used in the coupling reaction include, without any specific limitations, difunctional coupling agents, trifunctional coupling agents, tetrafunctional coupling agents, and coupling agents having a functionality of 5 or higher.

Examples of difunctional coupling agents include difunctional halosilanes such as dichlorosilane, monomethyldichlorosilane, and dichlorodimethylsilane; difunctional haloalkanes such as dichloroethane, dibromoethane, methylene chloride, and dibromomethane; and difunctional tin halides such as tin dichloride, monomethyltin dichloride, dimethyltin dichloride, monoethyltin dichloride, diethyltin dichloride, monobutyltin dichloride, and dibutyltin dichloride.

Examples of trifunctional coupling agents include trifunctional haloalkanes such as trichloroethane and trichloropropane; trifunctional halosilanes such as methyltrichlorosilane and ethyltrichlorosilane; and trifunctional alkoxysilanes such as methyltrimethoxysilane, phenyltrimethoxysilane, and phenyltriethoxysilane.

Examples of tetrafunctional coupling agents include tetrafunctional haloalkanes such as carbon tetrachloride, carbon tetrabromide, and tetrachloroethane; tetrafunctional halosilanes such as tetrachlorosilane and tetrabromosilane; tetrafunctional alkoxysilanes such as tetramethoxysilane and tetraethoxysilane; and tetrafunctional tin halides such as tin tetrachloride and tin tetrabromide.

Examples of coupling agents having a functionality of 5 or higher include 1,1,1,2,2-pentachloroethane, perchloroethane, pentachlorobenzene, perchlorobenzene, octabromodiphenyl ether, and decabromodiphenyl ether.

One of these coupling agents may be used individually, or two or more of these coupling agents may be used in combination.

Of these coupling agents, dichlorodimethylsilane is preferable. Note that through the coupling reaction using a coupling agent, a coupling moiety derived from the coupling agent is introduced into a macromolecule chain (for example, a triblock structure) of the block copolymer.

After the block copolymerization described above, hydrogenation and/or graft polymerization may be performed as necessary. In a case in which the previously described coupling reaction is performed after block copolymerization, hydrogenation and/or graft polymerization may be performed before the coupling reaction or may be performed after the coupling reaction.

The hydrogenation makes it possible to convert at least some aliphatic conjugated diene monomer units having a carbon number of 5 or more to hydrogenated aliphatic conjugated diene monomer units having a carbon number of 5 or more and thereby obtain a block copolymer that includes a hydrogenated aliphatic conjugated diene monomer unit having a carbon number of 5 or more in the (hydrogenated) C5 or higher aliphatic conjugated diene block region. Selective hydrogenation of an aliphatic conjugated diene monomer unit having a carbon number of 5 or more can be carried out by a commonly known method such as an oil-layer hydrogenation method or a water-layer hydrogenation method.

Moreover, by performing graft polymerization, it is possible to obtain a block copolymer that includes a graft portion such as previously described as the other region. No specific limitations are placed on the method of graft polymerization. For example, a polymer including an aromatic vinyl block region and a (hydrogenated) aliphatic conjugated diene block region that includes an aliphatic conjugated diene monomer unit having a carbon number of 5 or more may be produced, and then graft polymerization of an acidic group-containing monomer such as previously described, or the like, may be performed by a known method with respect to the polymer as a backbone portion to obtain a block copolymer having a structure in which a polymer of a graft portion is bonded to an aliphatic conjugated diene monomer unit having a carbon number of 5 or more of the polymer of the backbone portion.

<<Weight-Average Molecular Weight>>

The weight-average molecular weight of the block copolymer that can be produced as set forth above is preferably 50,000 or more, more preferably 60,000 or more, and even more preferably 70,000 or more, and is preferably 1,000,000 or less, more preferably 900,000 or less, and even more preferably 850,000 or less. When the weight-average molecular weight of the block copolymer is 50,000 or more, polymer strength is ensured, and squashing of the block copolymer can be inhibited during pressing of a functional layer. Consequently, charge carrier acceptance of a secondary battery at low temperatures can be further improved. On the other hand, when the weight-average molecular weight of the block copolymer is 1,000,000 or less, flexibility of the block copolymer is ensured and, in a situation in which pressing of a functional layer is performed, the shape of the block copolymer can track an adhesion target adjacent thereto to an extent that enables sufficient expression of a function as a binder. Consequently, battery members can be more strongly adhered via the functional layer, and post-cycling swelling of a secondary battery can be further inhibited.

The "weight-average molecular weight" of the block copolymer referred to in the present disclosure can be measured by a method described in the EXAMPLES section of the present specification.

<<Coupling Ratio>>

The coupling ratio of the block copolymer is preferably 60 mass % or more, more preferably 65 mass % or more, and even more preferably 70 mass % or more, and is preferably 92 mass % or less, more preferably 90 mass % or less, and even more preferably 88 mass % or less. When the coupling ratio of the block copolymer is 60 mass % or more, polymer strength is ensured, and squashing of the block copolymer can be inhibited during pressing of a functional layer. Consequently, charge carrier acceptance of a secondary battery at low temperatures can be further improved. On the other hand, when the coupling ratio of the block copolymer is 92 mass % or less, flexibility of the block copolymer is ensured and, in a situation in which pressing of a functional layer is performed, the shape of the block copolymer can track an adhesion target adjacent thereto to an extent that enables sufficient expression of a function as a binder. Consequently, battery members can be more strongly adhered via the functional layer, and post-cycling swelling of a secondary battery can be further inhibited.

Note that the "coupling ratio" referred to in the present disclosure is the proportion (mass %) constituted by coupling moiety-containing structures among all structures (diblock structures, triblock structures, etc.) of a polymer obtained through a coupling reaction. The "coupling ratio" of the block copolymer can be measured by a method described in the EXAMPLES section of the present specification.

Moreover, the coupling ratio can be adjusted by altering the amount of the coupling agent that is used in the coupling reaction, for example.

<Non-Conductive Inorganic Particles>

The non-conductive inorganic particles are a component that inhibits excessive squashing of the block copolymer serving as a binder and can contribute to improving charge carrier acceptance of a secondary battery at low temperatures as previously described. Moreover, in a case in which a porous membrane layer is formed from the presently disclosed composition for a functional layer, the non-conductive inorganic particles are also a component that can impart desired heat resistance and strength to the porous membrane layer.

The non-conductive inorganic particles may be any particles that are non-conductive and are formed of an inorganic material without any specific limitations and examples thereof include silica, talc, aluminum oxide (alumina), hydrous aluminum oxide (boehmite), silicon oxide, magnesium oxide (magnesia), calcium oxide, titanium oxide (titania), $BaTiO_3$, ZrO, alumina-silica complex oxide, aluminum nitride, boron nitride, silicon, diamond, barium sulfate, calcium fluoride, barium fluoride, and montmorillonite. The non-conductive inorganic particles listed above as examples are also inclusive of those that have undergone element substitution, surface treatment, solid solution treatment, and/or the like. One type of non-conductive inorganic particles may be used individually, or two or more types of non-conductive inorganic particles may be used in combination.

<Non-Conductive Inorganic Particles A Having Volume-Average Particle Diameter of 1.0 µm or More>

The composition for a functional layer preferably contains non-conductive inorganic particles A having a volume-average particle diameter of 1.0 µm or more from a viewpoint of sufficiently inhibiting excessive squashing of the block copolymer and further improving charge carrier acceptance of a secondary battery at low temperatures.

The non-conductive inorganic particles A are preferably either or both of silica and talc. In other words, the non-conductive inorganic particles A are preferably silica, talc, or a mixture of silica and talc. Note that the non-conductive inorganic particles listed above as examples are also inclusive of those that have undergone element substitution, surface treatment, solid solution treatment, and/or the like The volume-average particle diameter of the non-conductive inorganic particles A is 1.0 µm or more, preferably 4.0 µm or more, more preferably 4.2 µm or more, even more preferably 4.4 µm or more, and particularly preferably 5.1 µm or more, and is preferably 20.0 µm or less, more preferably 19.5 µm or less, even more preferably 19.2 µm or less, and particularly preferably 17.7 µm or less. By using the non-conductive inorganic particles A having a volume-average particle diameter of 1.0 µm or more, it is possible to sufficiently inhibit excessive squashing of the block copolymer and further improve charge carrier acceptance of a secondary battery at low temperatures as previously described. On the other hand, when the volume-average particle diameter of the non-conductive inorganic particles A is 20.0 µm or less, adhesion points with the block copolymer are ensured, and thus battery members can be more strongly adhered via a functional layer, and post-cycling swelling of a secondary battery can be further inhibited.

Moreover, when particle diameters corresponding to cumulative volumes of 25% and 75% from a small particle end in a particle diameter distribution of the non-conductive inorganic particles A are taken to be D25 and D75, respectively, D25/D75 is preferably 0.20 or more, more preferably 0.25 or more, and even more preferably 0.28 or more from a viewpoint of inhibiting the formation of streaks during application of the composition for a functional layer onto a substrate. Note that although no specific limitations are placed on the upper limit for D25/D75 of the non-conductive inorganic particles A, D25/D75 of the non-conductive inorganic particles A is normally 1.00 or less.

<<Silica>>

The volume-average particle diameter of the silica is preferably 16.0 µm or more, more preferably 16.5 µm or more, and even more preferably 16.8 µm or more, and is preferably 20.0 µm or less, more preferably 19.5 µm or less, and even more preferably 19.2 µm or less. By using silica having a volume-average particle diameter of 16.0 µm or more, it is possible to sufficiently inhibit excessive squashing of the block copolymer and further improve charge carrier acceptance of a secondary battery at low temperatures. On the other hand, when the volume-average particle diameter of the silica is 20.0 µm or less, adhesion points with the block copolymer are ensured, and thus battery members can be more strongly adhered via a functional layer, and post-cycling swelling of a secondary battery can be further inhibited.

Moreover, when particle diameters corresponding to cumulative volumes of 25% and 75% from a small particle end in a particle diameter distribution of the silica are taken to be D25 and D75, respectively, D25/D75 is preferably 0.30 or more, more preferably 0.35 or more, and even more preferably 0.38 or more from a viewpoint of inhibiting the formation of streaks during application of the composition for a functional layer onto a substrate. Note that although no specific limitations are placed on the upper limit for D25/D75 of the silica, D25/D75 of the silica is normally 1.00 or less.

<<Talc>>

The volume-average particle diameter of the talc is preferably 4.0 µm or more, more preferably 4.2 µm or more, and even more preferably 4.4 µm or more, and is preferably 6.0 µm or less, more preferably 5.8 µm or less, and even more preferably 5.6 µm or less. By using talc having a volume-average particle diameter of 4.0 µm or more, it is possible to sufficiently inhibit excessive squashing of the block copolymer and further improve charge carrier acceptance of a secondary battery at low temperatures. On the other hand, when the volume-average particle diameter of the talc is 6.0 µm or less, adhesion points with the block copolymer are ensured, and thus battery members can be more strongly adhered via a functional layer, and post-cycling swelling of a secondary battery can be further inhibited.

Moreover, when particle diameters corresponding to cumulative volumes of 25% and 75% from a small particle end in a particle diameter distribution of the talc are taken to be D25 and D75, respectively, D25/D75 is preferably 0.20 or more, more preferably 0.25 or more, and even more preferably 0.28 or more from a viewpoint of inhibiting the formation of streaks during application of the composition for a functional layer onto a substrate. Note that although no specific limitations are placed on the upper limit for D25/D75 of the talc, D25/D75 of the talc is normally 1.00 or less.

<<Amount of Non-Conductive Inorganic Particles A>>

The composition for a functional layer preferably contains 0.05 parts by mass or more, more preferably 0.07 parts by mass or more, and even more preferably 0.09 parts by mass or more of the non-conductive inorganic particles A per 100 parts by mass of the previously described block copolymer, and preferably contains 1.50 parts by mass or less, more preferably 1.30 parts by mass or less, and even more preferably 1.10 parts by mass or less of the non-conductive inorganic particles A per 100 parts by mass of the previously described block copolymer. When the amount of the non-conductive inorganic particles A in the composition for a functional layer is 0.05 parts by mass or more per 100 parts by mass of the block copolymer, excessive squashing of the polymer can be sufficiently inhibited, and charge carrier acceptance of a secondary battery at low temperatures can be further improved. On the other hand, when the amount of the non-conductive inorganic particles A in the composition for a functional layer is 1.50 parts by mass or less per 100 parts by mass of the block copolymer, battery members can be sufficiently strongly adhered via a functional layer, and post-cycling swelling of a secondary battery is not negatively affected.

<Non-Conductive Inorganic Particles B Having Volume-Average Particle Diameter of Less than 1.0 µm>

In a case in which the composition for a functional layer is used to form a porous membrane layer as a functional layer, the composition for a functional layer preferably contains non-conductive inorganic particles B having a volume-average particle diameter of less than 1.0 µm in addition to the previously described non-conductive inorganic particles A having a volume-average particle diameter of 1.0 µm or more. By using a composition for a functional layer containing the non-conductive inorganic particles A and the non-conductive inorganic particles B to form a porous membrane layer, in particular, this enables good formation of a porous membrane layer that has excellent heat resistance and strength and that can inhibit post-cycling swelling of a secondary battery and improve charge carrier acceptance of the secondary battery at low temperatures.

The non-conductive inorganic particles B are preferably at least one selected from the group consisting of aluminum oxide (alumina), hydrous aluminum oxide (boehmite), silicon oxide, magnesium oxide (magnesia), calcium oxide, titanium oxide (titania), $BaTiO_3$, ZrO, alumina-silica complex oxide, aluminum nitride, boron nitride, silicon, diamond, barium sulfate, calcium fluoride, barium fluoride, and montmorillonite. Note that the non-conductive inorganic particles listed above as examples are also inclusive of those that have undergone element substitution, surface treatment, solid solution treatment, and/or the like.

The volume-average particle diameter of the non-conductive inorganic particles B is preferably 0.1 µm or more, more preferably 0.15 µm or more, and even more preferably 0.2 µm or more, and is less than 1.0 µm. When the volume-average particle diameter of the non-conductive inorganic particles B is within any of the ranges set forth above, this enables good formation of a porous membrane layer that has excellent heat resistance and strength and that can inhibit post-cycling swelling of a secondary battery and improve charge carrier acceptance of the secondary battery at low temperatures.

Note that in a case in which the previously described non-conductive inorganic particles A have a volume-average particle diameter of 4.0 µm or more (i.e., in a case in which the non-conductive inorganic particles A are defined as "non-conductive inorganic particles A having a volume-average particle diameter of 4.0 µm or more", for example), the volume-average particle diameter of the non-conductive inorganic particles B in that case can be set as less than 4.0 µm, and is preferably 3.0 µm or less, more preferably 2.0 µm or less, and even more preferably less than 1.0 µm.

<<Amount of Non-Conductive Inorganic Particles B>>

The composition for a functional layer (particularly in the case of a slurry composition for a non-aqueous secondary battery porous membrane layer) preferably contains 400 parts by mass or more, more preferably 500 parts by mass or more, and even more preferably 600 parts by mass or more of the non-conductive inorganic particles B per 100 parts by mass of the previously described block copolymer, and preferably contains 2,500 parts by mass or less, more preferably 2,300 parts by mass or less, and even more preferably 2,000 parts by mass or less of the non-conductive inorganic particles B per 100 parts by mass of the previously described block copolymer. When the amount of the non-conductive inorganic particles B in the composition for a functional layer is 400 parts by mass or more per 100 parts by mass of the block copolymer, this enables good formation of a porous membrane layer that has excellent heat resistance and strength and that can inhibit post-cycling swelling of a secondary battery and improve charge carrier acceptance of the secondary battery at low temperatures. On the other hand, when the amount of the non-conductive inorganic particles B in the composition for a functional layer is 2,500 parts by mass or less per 100 parts by mass of the block copolymer, battery members can be sufficiently strongly adhered via a functional layer, and post-cycling swelling of a secondary battery is not negatively affected.

<Solvent>

The solvent contained in the presently disclosed composition for a functional layer is not specifically limited, but preferably includes water. Moreover, the presently disclosed composition for a functional layer may contain, as the solvent, an organic solvent that was used as a reaction solvent in production of the block copolymer.

<Other Components>

The presently disclosed composition for a functional layer can contain components other than those described above (i.e., other components). For example, the composition for a functional layer preferably contains electrode active material particles in a case in which the composition for a functional layer is a slurry composition for a non-aqueous secondary battery electrode.

Moreover, the composition for a functional layer may contain a polymer component that does not correspond to the previously described block copolymer. For example, the composition for a functional layer may contain a known particulate binder such as a styrene-butadiene random copolymer or an acrylic polymer. Moreover, the composition for a functional layer may contain known additives. Examples of such known additives include antioxidants, defoamers, and dispersants. Note that one other component may be used individually, or two or more other components may be used in combination in a freely selected ratio.

<<Electrode Active Material Particles>>

Particles formed of known electrode active materials used in secondary batteries can be used without any specific limitations as the electrode active material particles. Specifically, examples of electrode active material particles that can be used in an electrode mixed material layer of a lithium ion secondary battery, which is one example of a secondary battery, include particles formed of any of the electrode active materials described below, but are not specifically limited thereto.

[Positive Electrode Active Material]

Examples of positive electrode active materials that can be compounded in a positive electrode mixed material layer of a positive electrode in a lithium ion secondary battery include transition metal-containing compounds such as transition metal oxides, transition metal sulfides, and complex metal oxides of lithium and transition metals. Examples of transition metals include Ti, V, Cr, Mn, Fe, Co, Ni, Cu, and Mo.

Specific examples of positive electrode active materials include, but are not specifically limited to, lithium-containing cobalt oxide ($LiCoO_2$), lithium manganate ($LiMn_2O_4$), lithium-containing nickel oxide ($LiNiO_2$), a lithium-containing complex oxide of Co—Ni—Mn, a lithium-containing complex oxide of Ni—Mn—Al, a lithium-containing complex oxide of Ni—Co—Al, olivine-type lithium iron phosphate ($LiFePO_4$), olivine-type lithium manganese phosphate ($LiMnPO_4$), lithium-rich spinel compounds represented by $Li_{1+x}Mn_{2-x}O_4$ ($0<x<2$), $Li[Ni_{0.17}Li_{0.2}Co_{0.07}Mn_{0.56}]O_2$, and $LiNi_{0.5}Mn_{1.5}O_4$.

One of the positive electrode active materials described above may be used individually, or two or more of the positive electrode active materials described above may be used in combination.

[Negative Electrode Active Material]

Examples of negative electrode active materials that can be compounded in a negative electrode mixed material layer of a negative electrode in a lithium ion secondary battery include carbon-based negative electrode active materials, metal-based negative electrode active materials, and negative electrode active materials that are a combination thereof.

Herein, "carbon-based negative electrode active material" refers to an active material having a main framework of carbon into which lithium can be inserted (also referred to as "doping"). Specific examples of carbon-based negative electrode active materials include carbonaceous materials such as coke, mesocarbon microbeads (MCMB), mesophase pitch-based carbon fiber, pyrolytic vapor-grown carbon fiber, pyrolyzed phenolic resin, polyacrylonitrile-based carbon fiber, quasi-isotropic carbon, pyrolyzed furfuryl alcohol resin (PFA), and hard carbon, and graphitic materials such as natural graphite and artificial graphite.

A metal-based negative electrode active material is an active material that contains metal, the structure of which usually contains an element that allows insertion of lithium, and that has a theoretical electric capacity per unit mass of 500 mAh/g or more when lithium is inserted. Examples of metal-based active materials include lithium metal, simple substances of metals that can form a lithium alloy (for example, Ag, Al, Ba, Bi, Cu, Ga, Ge, In, Ni, P, Pb, Sb, Si, Sn, Sr, Zn, and Ti), and oxides, sulfides, nitrides, silicides, carbides, and phosphides thereof. Moreover, oxides such as lithium titanate can be used.

One of the negative electrode active materials described above may be used individually, or two or more of the negative electrode active materials described above may be used in combination.

<<Amount of Electrode Active Material Particles>>

The composition for a functional layer (particularly in the case of a slurry composition for a non-aqueous secondary battery electrode) preferably contains 20 parts by mass or more, more preferably 25 parts by mass or more, and even more preferably 30 parts by mass or more of the electrode active material particles per 1 part by mass of the previously described block copolymer, and preferably contains 300 parts by mass or less, more preferably 250 parts by mass or less, and even more preferably 200 parts by mass or less of the electrode active material particles per 1 part by mass of the previously described block copolymer.

<Production Method of Composition for Functional Layer>

The presently disclosed composition for a functional layer can be produced by mixing the components described above without any specific limitations. For example, in a case in which a composition for a functional layer containing water as a solvent is to be produced, a block copolymer obtained as a solution containing an organic solvent is preferably subjected to an emulsification step.

The method of emulsification in the emulsification step is not specifically limited, but is preferably a method of performing phase-inversion emulsification of a preliminary mixture of a solution that contains the block copolymer and the organic solvent (block copolymer solution) and an aqueous solution of an emulsifier, for example. The phase-inversion emulsification can be carried out using a known emulsifier and a known emulsifying and dispersing device, for example.

A water dispersion of the block copolymer can then be obtained by using a known method to remove the organic solvent from the emulsion obtained after phase-inversion emulsification as necessary.

(Non-Aqueous Secondary Battery Member)

The presently disclosed battery member is a member that includes a functional layer and may, more specifically, be an electrode or a separator.

The functional layer is a layer having a function such as giving and receiving electrons, reinforcement, or adhesion inside a secondary battery. For example, the functional layer may be an electrode mixed material layer that gives and receives electrons through electrochemical reactions or a porous membrane layer that improves heat resistance and strength.

The functional layer included in the presently disclosed battery member is a layer that is formed from the presently disclosed composition for a functional layer set forth above, and can be formed by, for example, applying the composition for a functional layer set forth above onto the surface of a suitable substrate to form a coating film, and subsequently drying the coating film that is formed. In other words, the functional layer included in the presently disclosed battery member is formed of a dried product of the composition for a functional layer set forth above, normally contains at least the previously described block copolymer and non-conductive inorganic particles, and optionally contains other components such as electrode active material particles. Note that components contained in the functional layer are components that were contained in the composition for a functional layer, and hence the preferred ratio of these components in the functional layer is the same as the preferred ratio of the components in the composition for a functional layer.

The presently disclosed battery member may include more than one functional layer that is formed from the presently disclosed composition for a functional layer. For example, an electrode that is the presently disclosed battery member may include an electrode mixed material layer formed from the presently disclosed composition for a functional layer (slurry composition for an electrode) on a current collector and may also include a porous membrane layer formed from the presently disclosed composition for a functional layer (slurry composition for a porous membrane layer) on the electrode mixed material layer.

Moreover, the presently disclosed battery member may include constituent elements other than a functional layer that is formed from the presently disclosed composition for a functional layer set forth above and a substrate. Examples of such constituent elements include, but are not specifically limited to, electrode mixed material layers, porous membrane layers, and adhesive layers that do not correspond to a functional layer formed from the presently disclosed composition for a functional layer.

As a result of the presently disclosed battery member including a functional layer that is formed from the presently disclosed composition for a functional layer, the battery member can both inhibit post-cycling swelling of a secondary battery and increase charge carrier acceptance of the secondary battery at low temperatures.

<<Substrate>>

No limitations are placed on the substrate onto which the composition for a functional layer is applied. For example, a coating film of the composition for a functional layer may be formed on the surface of a releasable substrate, the coating film may be dried to form a functional layer, and then the releasable substrate may be peeled from the functional layer. The functional layer that is peeled from the releasable substrate in this manner can be used as a free-standing film in formation of the battery member for a secondary battery.

However, it is preferable that a current collector, a separator substrate, or an electrode substrate is used as the substrate from a viewpoint of raising battery member production efficiency since a step of peeling the functional layer can be omitted. Specifically, the composition for a functional layer is preferably applied onto a current collector serving as a substrate when an electrode mixed material layer is to be produced. Moreover, the composition for a functional layer is preferably applied onto a separator substrate or an electrode substrate when a porous membrane layer is to be produced.

<<Current Collector>>

The current collector is a material having electrical conductivity and electrochemical durability. Specifically, the current collector may be made of, for example, iron, copper, aluminum, nickel, stainless steel, titanium, tantalum, gold, or platinum. Of these materials, copper foil is particularly preferable as a current collector used for a negative electrode. On the other hand, aluminum foil is particularly preferable as a current collector used for a positive electrode. One of these materials may be used individually, or two or more of these materials may be used in combination in a freely selected ratio.

<<Separator Substrate>>

The separator substrate is not specifically limited and may be a known separator substrate such as an organic separator substrate. The organic separator substrate is a porous member that is made of an organic material. The organic separator substrate may, for example, be a microporous membrane or non-woven fabric containing a polyolefin resin such as polyethylene or polypropylene, an aromatic polyamide resin, or the like. In particular, a microporous membrane or non-woven fabric made from polyethylene is preferable due to having excellent strength.

<<Electrode Substrate>>

The electrode substrate (positive electrode substrate or negative electrode substrate) is not specifically limited and may be an electrode substrate including an electrode mixed material layer that contains electrode active material particles and a binder and that is formed on the current collector described above.

Known electrode active material particles and binders can be used without any specific limitations as the electrode active material particles and the binder contained in the electrode mixed material layer of the electrode substrate. Moreover, an electrode mixed material layer formed from the presently disclosed composition for a functional layer may be used as the electrode mixed material layer of the electrode substrate.

<Production Method of Battery Member>

Examples of methods by which the functional layer may be formed on a substrate such as the current collector, separator substrate, or electrode substrate described above to produce the battery member include:

(1) a method in which the presently disclosed composition for a functional layer is applied onto the surface of the substrate (surface at the electrode mixed material layer side in the case of an electrode substrate; same applies below) and is then dried;

(2) a method in which the substrate is immersed in the presently disclosed composition for a functional layer and is then dried; and (3) a method in which the presently disclosed composition for a functional layer is applied onto a releasable substrate and is dried to produce a functional layer that is then transferred onto the surface of the substrate.

Of these methods, method (1) is particularly preferable since it allows simple control of the thickness of the functional layer. In more detail, method (1) includes a step of applying the composition for a functional layer onto a substrate (application step) and a step of drying the composition for a functional layer that has been applied onto the substrate to form a functional layer (functional layer formation step).

<<Application Step>>

Examples of methods by which the composition for a functional layer can be applied onto the substrate in the application step include, but are not specifically limited to, doctor blading, reverse roll coating, direct roll coating, gravure coating, extrusion coating, and brush coating.

<<Functional Layer Formation Step>>

The method by which the composition for a functional layer on the substrate is dried in the functional layer formation step is not specifically limited and may be a commonly known method. Examples of drying methods that can be used include drying by warm, hot, or low-humidity air; drying in a vacuum; and drying through irradiation with infrared light, electron beams, or the like.

In a case in which an electrode mixed material layer is produced as the functional layer, the density of the electrode mixed material layer can be increased by pressing the electrode mixed material layer by roll pressing or the like after the drying described above. An electrode that is the presently disclosed battery member can cause a secondary battery to display excellent charge carrier acceptance at low temperatures even in a case in which the electrode mixed material layer thereof is pressed by roll pressing or the like as a result of the electrode mixed material layer being formed from the presently disclosed composition for a functional layer.

In a case in which a negative electrode mixed material layer is produced as the functional layer, the density of the negative electrode mixed material layer can be set as 1.60 g/cm$^3$ or more, or can be set as 1.70 g/cm$^3$ or more. Although no specific limitations are placed on the upper limit of the density of the negative electrode mixed material layer, the density of the negative electrode mixed material layer can be set as 2.00 g/cm$^3$ or less, for example. By forming the negative electrode mixed material layer from the presently disclosed composition for a functional layer, a secondary battery can be caused to display excellent charge carrier acceptance at low temperatures even in a case in which densification of the negative electrode mixed material layer is performed as described above.

The "density" of a negative electrode mixed material layer referred to in the present disclosure can be calculated using the mass of the negative electrode mixed material layer per unit area and the thickness of the negative electrode mixed material layer.

(Non-Aqueous Secondary Battery)

The presently disclosed secondary battery includes the presently disclosed battery member set forth above. More specifically, the presently disclosed secondary battery includes a positive electrode, a negative electrode, a separator, and an electrolyte solution, and at least one of the positive electrode, the negative electrode, and the separator is the battery member set forth above. The presently disclosed secondary battery has excellent charge carrier acceptance at low temperatures, and post-cycling swelling thereof is inhibited.

<Positive Electrode, Negative Electrode, and Separator>

At least one of the positive electrode, the negative electrode, and the separator used in the presently disclosed secondary battery is the presently disclosed battery member set forth above. Known positive electrodes, negative electrodes, and separators can be used without any specific limitations as a positive electrode, negative electrode, or separator that is not the presently disclosed battery member (i.e., that does not include a functional layer formed from the presently disclosed composition for a functional layer).

<Electrolyte Solution>

The electrolyte solution is normally an organic electrolyte solution obtained by dissolving a supporting electrolyte in an organic solvent. The supporting electrolyte may, for example, be a lithium salt in the case of a lithium ion secondary battery. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable as they readily dissolve in solvents and exhibit a high degree of dissociation. One electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of suitable organic solvents in the case of a lithium ion secondary battery include carbonates such as dimethyl carbonate (DMC), ethylene carbonate (EC), diethyl carbonate (DEC), propylene carbonate (PC), butylene carbonate (BC), ethyl methyl carbonate (EMC), and vinylene carbonate (VC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of these solvents may be used. Of these solvents, carbonates are preferable due to having high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

<Production Method of Non-Aqueous Secondary Battery>

The presently disclosed secondary battery set forth above can be produced by, for example, stacking the positive electrode and the negative electrode with the separator in-between, performing rolling, folding, compressing, or the like of the resultant laminate as necessary to place the laminate in a battery container, injecting the electrolyte solution into the battery container, and sealing the battery container. At least one battery member among the positive electrode, the negative electrode, and the separator is the presently disclosed battery member including a functional layer formed from the presently disclosed composition for a functional layer. In order to prevent pressure increase inside the battery and occurrence of overcharging or overdischarging, an expanded metal; an overcurrent preventing device such as a fuse or a PTC device; or a lead plate may be provided in the battery container as necessary. The shape of the battery may, for example, be a coin type, a button type, a sheet type, a cylinder type, a prismatic type, or a flat type.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through polymerization of a plurality of types of monomers, the proportion in the polymer constituted by a monomer unit that is formed through polymerization of a given monomer is normally, unless otherwise specified, the same as the ratio (charging ratio) of the given monomer among all monomers used in polymerization of the polymer.

In the examples and comparative examples, the following methods were used to evaluate the weight-average molecular weight and coupling ratio of a block copolymer; the volume-average particle diameter and D25/D75 of non-conductive inorganic particles; and the lithium ion acceptance at low temperatures and inhibition of post-cycling swelling of a lithium ion secondary battery.

<Weight-Average Molecular Weight and Coupling Ratio of Block Copolymer>

The weight-average molecular weight of a block copolymer was measured as a polystyrene-equivalent molecular weight by high-performance liquid chromatography (apparatus: HLC8220 (model number) produced by Tosoh Corporation). This measurement was performed using three connected columns (Shodex KF-404HQ (model number) produced by Showa Denko K.K.; column temperature: 40° C.; carrier: tetrahydrofuran at flow rate of 0.35 mL/min) and using a differential refractometer and a UV detector as detectors. Molecular weight calibration was performed by 12 points for standard polystyrene (produced by Polymer Laboratories Ltd.; standard molecular weight: 500 to 3,000,000). The weight-average molecular weight of the block copolymer was identified from a chart obtained through this high-performance liquid chromatography. In addition, peaks were attributed to structures (for example, diblock structures and triblock structures), and then the coupling ratio (mass %) of the block copolymer was calculated from the area ratio of these peaks.

<Volume-Average Particle Diameter and D25/D75 of Non-Conductive Inorganic Particles>

The volume-average particle diameter of non-conductive inorganic particles was measured using a laser diffraction/scattering measurement apparatus (produced by Shimadzu Corporation; product name: SALD-2300). Specifically, a water dispersion that had been adjusted to a sample concentration such that a maximum value of a light intensity distribution was 50% was measured by the apparatus, and then a particle diameter at which cumulative volume calculated from a small diameter end in the obtained particle size distribution (by volume) reached 50% was determined as the volume-average particle diameter (μm). In addition, a particle diameter at which cumulative volume calculated from the small diameter end reached 25% was determined as the volume-average particle diameter (μm) of D25, a particle diameter at which the cumulative volume reached 75% was determined as the volume-average particle diameter (μm) of D75, and D25/D75 was calculated.

<Lithium Ion Acceptance at Low Temperatures>

A produced lithium ion secondary battery was left at rest in a 25° C. environment for 24 hours, was subsequently subjected to a charging operation for 1 hour with a constant current at 1.0 C in a 25° C. environment, and the normal temperature charge capacity (C0) of the lithium ion secondary battery was measured. Thereafter, the lithium ion secondary battery was discharged with a 0.1 C constant current in a 25° C. environment, and this discharging was stopped when 3 V was reached. Next, the lithium ion secondary battery was subjected to 1 hour of charging with a constant current at 1.0 C in a −10° C. environment, and the low-temperature charge capacity (C1) thereof was measured. A ratio (C1/C0) of C1 relative to C0 was calculated and was evaluated by the following standard. A larger value for C1/C0 indicates that the secondary battery has better lithium ion acceptance at low temperatures.

A: C1/C0 of not less than 0.65 and not more than 1
B: C1/C0 of not less than 0.5 and less than 0.65
C: C1/C0 of less than 0.5

<Inhibition of Post-Cycling Swelling>

A produced lithium ion secondary battery was left at rest in a 25° C. environment for 5 hours and then the thickness (d0) of the battery was measured. Next, the lithium ion secondary battery was subjected to 250 cycles of an operation of constant current-constant voltage charging (CC-CV charging) to 4.2 V at 1 C (cut-off condition: 0.05 C) and constant current discharging (CC discharging) to 3 V at 1 C in a 25° C. environment.

At the end of 250 cycles, the lithium ion secondary battery was CC-CV charged to 4.2 V at 1 C (cut-off condition: 0.05 C) in a 25° C. environment, and the thickness (d1) of the battery in a charged state was measured. The rate of thickness increase after cycling (={(d1−d0)/d0}×100(%)) was calculated and was evaluated by the following standard. A smaller value for the rate of thickness increase after cycling indicates that post-cycling swelling of the secondary battery is inhibited.

A: Rate of thickness increase after cycling of less than 8%
B: Rate of thickness increase after cycling of not less than 8% and less than 12%
C: Rate of thickness increase after cycling of 12% or more Example 1

<Production of Block Copolymer and Composition for Functional Layer>

A pressure-resistant reactor was charged with 233.3 kg of cyclohexane, 54.2 mmol of N,N,N',N'-tetramethylethylenediamine (TMEDA), and 25.0 kg of styrene as an aromatic vinyl monomer. These materials were stirred at 40° C. while 1806.5 mmol of n-butyllithium was added thereto as a polymerization initiator, and were heated to 50° C. while polymerization was carried out for 1 hour. The polymerization conversion rate of styrene was 100%. Next, temperature control was performed to maintain a temperature of 50° C. to 60° C. while continuously adding 75.0 kg of isoprene into the pressure-resistant reactor over 1 hour as an aliphatic conjugated diene monomer having a carbon number of 5 or more. The polymerization reaction was continued for 1 hour after completing addition of the isoprene. The polymerization conversion rate of isoprene was 100%. Next, 740.6 mmol of dichlorodimethylsilane was added into the pressure-resistant reactor as a coupling agent and a coupling reaction was performed for 2 hours. Thereafter, 3612.9 mmol of methanol was added to the reaction liquid and was thoroughly mixed therewith to deactivate active terminals.

The resultant block polymer had a proportional content of styrene units of 25%, a proportional content of isoprene units of 75%, a coupling ratio of 82%, and a weight-average molecular weight of 140,000. Next, 0.3 parts of 2,6-di-tert-butyl-p-cresol as an antioxidant was added to 100 parts of the reaction liquid (containing 30.0 parts of polymer component), 0.048 parts (0.16 parts per 100 parts of block copolymer) of silica and 0.012 parts (0.04 parts per 100 parts of block copolymer) of talc were further added as non-conductive inorganic particles A, and mixing was performed to obtain a mixture containing the block copolymer, silica, and talc. The volume-average particle diameter and D20/D50 of the silica, the talc, and the non-conductive inorganic particles (mixture of 0.16 parts of silica and 0.04 parts of talc) were measured. The results are shown in Table 1.

In addition, sodium linear alkylbenzene sulfonate was dissolved in deionized water to produce an aqueous solution having a total solid content of 2%.

A tank was charged with 500 g of the aqueous solution and 500 g of the aforementioned mixture, and preliminary mixing of these materials was performed by stirring. Next, a metering pump was used to transfer the preliminary mixture from the tank to a continuous high-performance emulsifying and dispersing device (produced by Pacific Machinery & Engineering Co., Ltd.; product name: Milder MDN303V) at a rate of 100 g/min, and the preliminary mixture was stirred at a rotation speed of 15,000 rpm to cause phase-inversion emulsification of the preliminary mixture and obtain an emulsion.

Cyclohexane in the obtained emulsion was subsequently vacuum evaporated in a rotary evaporator. Thereafter, the emulsion that had been subjected to evaporation was left to separate for 1 day in a chromatographic column equipped with a stop-cock, and the lower layer portion after separation was removed to perform concentration.

Finally, the upper layer portion was filtered through a 100-mesh screen to obtain a binder composition for a secondary battery negative electrode (solid content concentration: 40%) containing the block copolymer, silica, and talc as a composition for a functional layer.

A mixture was obtained by adding 70 parts of artificial graphite (produced by Hitachi Chemical Co., Ltd.; product name: MAG-E) and 25.6 parts of natural graphite (produced by Nippon Carbon Co., Ltd.; product name: 604A) as negative electrode active material particles, 1 part of carbon black (produced by TIMCAL; product name: Super C65) as a conductive material, and 1.2 parts in terms of solid content of a 2% aqueous solution of carboxymethyl cellulose (produced by Nippon Paper Industries Co., Ltd.; product name: MAC-350HC) as a thickener into a planetary mixer equipped with a disper blade. The obtained mixture was adjusted to a solid content concentration of 60% with deionized water and was subsequently mixed at 25° C. for 60 minutes. Next, the mixture was adjusted to a solid content concentration of 52% with deionized water and was then further mixed at 25° C. for 15 minutes to obtain a mixed liquid. Deionized water and 2.2 parts in terms of solid content of the binder composition for a secondary battery negative electrode produced as described above were added to the obtained mixed liquid, and the final solid content concentration was adjusted to 48%. Further mixing was performed for 10 minutes, and then a defoaming process was carried out under reduced pressure to yield a slurry composition for a secondary battery negative electrode having good fluidity as a composition for a functional layer.

<Production of Negative Electrode>

The obtained slurry composition for a secondary battery negative electrode was applied onto copper foil (current collector) of 20 μm in thickness by a comma coater such as to have a coating weight after drying of 14 mg/cm². The applied slurry composition was dried by conveying the copper foil inside a 60° C. oven for 2 minutes at a speed of 0.5 m/min. Thereafter, 2 minutes of heat treatment was performed at 120° C. to obtain a negative electrode web. The negative electrode web was rolled by roll pressing to obtain a negative electrode having a negative electrode mixed material layer thickness of 80 μm.

<Production of Positive Electrode>

A slurry composition for a secondary battery positive electrode was obtained by combining 100 parts of $LiCoO_2$ having a volume-average particle diameter of 12 μm as positive electrode active material particles, 2 parts of acetylene black (produced by Denka Company Limited; product name: HS-100) as a conductive material, 2 parts in terms of solid content of polyvinylidene fluoride (produced by Kureha Corporation; product name: #7208) as a binder, and N-methylpyrrolidone as a solvent such that the total solid content concentration was 70%, and mixing these materials using a planetary mixer.

The obtained slurry composition for a secondary battery positive electrode was applied onto aluminum foil (current collector) of 20 μm in thickness by a comma coater such as to have a thickness after drying of approximately 150 μm. The applied slurry composition was dried by conveying the aluminum foil inside a 60° C. oven for 2 minutes at a speed of 0.5 m/min. Thereafter, 2 minutes of heat treatment was performed at 120° C. to obtain a positive electrode web.

The positive electrode web was rolled by roll pressing to obtain a positive electrode including a positive electrode mixed material layer.

<Preparation of Separator>

A separator made from a single layer of polypropylene (produced by Celgard, LLC.; product name: Celgard 2500) was used as a separator.

<Production of Lithium Ion Secondary Battery>

The obtained positive electrode was cut out as a rectangle of 49 cm×5 cm and was placed with the surface at the positive electrode mixed material layer side facing upward. The separator was cut out as 120 cm×5.5 cm and was arranged on the positive electrode mixed material layer such that the positive electrode was positioned at a longitudinal direction left-hand side of the separator. In addition, the obtained negative electrode was cut out as a rectangle of 50 cm×5.2 cm and was arranged on the separator such that the surface at the negative electrode mixed material layer side of the negative electrode faced the separator and such that the negative electrode was positioned at a longitudinal direction right-hand side of the separator. The resultant laminate was wound by a winding machine to obtain a roll. The roll was enclosed in an aluminum packing case serving as a battery case, electrolyte solution (solvent: ethylene carbonate/diethyl carbonate/vinylene carbonate=68.5/30/1.5 (volume ratio); electrolyte: $LiPF_6$ of 1 M in concentration) was injected such that no air remained, and an opening of the aluminum packing case was closed by heat sealing at 150° C. to thereby produce a wound lithium ion secondary battery having a capacity of 800 mAh. The obtained lithium ion secondary battery was used to evaluate lithium ion acceptance at low temperatures and inhibition of post-cycling swelling. The results are shown in Table 1.

Examples 2 to 5

A block copolymer, compositions for a functional layer (a binder composition for a secondary battery negative electrode and a slurry composition for a secondary battery negative electrode), a negative electrode, a positive electrode, a separator, and a lithium ion secondary battery were prepared or produced in the same way as in Example 1 with the exception that the amounts of silica and talc were changed as shown in Table 1 in production of the binder composition for a secondary battery negative electrode as a composition for a functional layer. Evaluations were conducted in the same manner as in Example 1. The results are shown in Table 1.

Example 6

A block copolymer, compositions for a functional layer (a binder composition for a secondary battery negative electrode and a slurry composition for a secondary battery negative electrode), a negative electrode, a positive electrode, a separator, and a lithium ion secondary battery were prepared or produced in the same way as in Example 1 with the exception that silica having a volume-average particle diameter and D25/D75 shown in Table 1 was used in production of the binder composition for a secondary battery negative electrode as a composition for a functional layer. Evaluations were conducted in the same manner as in Example 1. The results are shown in Table 1.

Example 7

A block copolymer, compositions for a functional layer (a binder composition for a secondary battery negative electrode and a slurry composition for a secondary battery negative electrode), a negative electrode, a positive electrode, a separator, and a lithium ion secondary battery were prepared or produced in the same way as in Example 1 with the exception that talc having a volume-average particle diameter and D25/D75 shown in Table 1 was used in production of the binder composition for a secondary battery negative electrode as a composition for a functional layer. Evaluations were conducted in the same manner as in Example 1. The results are shown in Table 1.

Example 8

<Production of Block Copolymer and Binder Composition for Secondary Battery Porous Membrane Layer (Composition for Functional Layer)>

A block copolymer was produced in the same way as in Example 1. In addition, a composition for a functional layer containing the block copolymer, silica, and talc was produced in the same way as the "binder composition for a secondary battery negative electrode" in Example 1, and this composition for a functional layer was used as a binder composition for a secondary battery porous membrane layer.

<Production of Slurry Composition for Secondary Battery Porous Membrane Layer (Composition for Functional Layer)>

A slurry composition for a secondary battery porous membrane layer was produced by using a ball mill to mix 100 parts in terms of solid content of a water dispersion of alumina (produced by Sumitomo Chemical Co., Ltd.; product name: AKP3000; volume-average particle diameter: 0.81 μm) as non-conductive inorganic particles B, 0.5 parts in terms of solid content of carboxymethyl cellulose (1380 produced by Daicel FineChem Ltd.), and 8 parts in terms of solid content of the binder composition for a secondary battery porous membrane layer obtained as described above.

<Production of Porous Membrane Layer-Equipped Separator>

The slurry composition for a secondary battery porous membrane layer obtained as described above was applied onto one side of a separator made from a single layer of polypropylene (produced by Celgard, LLC.; product name: Celgard 2500) serving as a separator substrate and was dried at 50° C. for 3 minutes. Thereafter, the slurry composition for a secondary battery porous membrane layer obtained as described above was applied onto the other side of the separator and was dried at 50° C. for 3 minutes to obtain a porous membrane layer-equipped separator including porous membrane layers (each 1 μm in thickness) at both sides.

<Production of Negative Electrode>

A mixture was obtained by adding 70 parts of artificial graphite (produced by Hitachi Chemical Co., Ltd.; product name: MAG-E) and 25.6 parts of natural graphite (produced by Nippon Carbon Co., Ltd.; product name: 604A) as negative electrode active material particles, 1 part of carbon black (produced by TIMCAL; product name: Super C65) as a conductive material, and 1.2 parts in terms of solid content of a 2% aqueous solution of carboxymethyl cellulose (produced by Nippon Paper Industries Co., Ltd.; product name: MAC-350HC) as a thickener into a planetary mixer equipped with a disper blade. The obtained mixture was adjusted to a solid content concentration of 60% with deionized water and was subsequently mixed at 25° C. for 60 minutes. Next, the mixture was adjusted to a solid content concentration of 52% with deionized water and was then further mixed at 25° C. for 15 minutes to obtain a mixed liquid. Deionized water and 2.2 parts in terms of solid content of a binder composition for a secondary battery negative electrode produced in the same way as in Comparative Example 2 described further below were added to the obtained mixed liquid, and the final solid content concentration was adjusted to 48%. Further mixing was performed for 10 minutes, and then a defoaming process was carried out under reduced pressure to yield a slurry composition for a secondary battery negative electrode having good fluidity.

<Production of Positive Electrode>

A positive electrode was produced in the same way as in Example 1.

<Production of Lithium Ion Secondary Battery>

The obtained positive electrode was cut out as a rectangle of 49 cm×5 cm and was placed with the surface at the positive electrode mixed material layer side facing upward. The porous membrane layer-equipped separator was cut out as 120 cm×5.5 cm and was arranged on the positive electrode mixed material layer such that the positive electrode was positioned at a longitudinal direction left-hand side of the separator. In addition, the obtained negative electrode was cut out as a rectangle of 50 cm×5.2 cm and was arranged on the separator such that the surface at the negative electrode mixed material layer side of the negative electrode faced the porous membrane layer-equipped separator and such that the negative electrode was positioned at a longitudinal direction right-hand side of the porous membrane layer-equipped separator. The resultant laminate was wound by a winding machine to obtain a roll. The roll was enclosed in an aluminum packing case serving as a battery case, electrolyte solution (solvent: ethylene carbonate/diethyl carbonate/vinylene carbonate=68.5/30/1.5 (volume ratio); electrolyte: $LiPF_6$ of 1 M in concentration) was injected such that no air remained, and an opening of the aluminum packing case was closed by heat sealing at 150° C. to thereby produce a wound lithium ion secondary battery having a capacity of 800 mAh. The obtained lithium ion secondary battery was used to evaluate lithium ion acceptance at low temperatures and inhibition of post-cycling swelling. The results are shown in Table 1.

Comparative Example 1

A block copolymer, compositions for a functional layer (a binder composition for a secondary battery negative electrode and a slurry composition for a secondary battery negative electrode), a negative electrode, a positive electrode, a separator, and a lithium ion secondary battery were prepared or produced in the same way as in Example 1 with the exception that silica and talc were not used in production of the binder composition for a secondary battery negative electrode as a composition for a functional layer. Evaluations were conducted in the same manner as in Example 1. The results are shown in Table 1.

Comparative Example 2

Compositions for a functional layer (a binder composition for a secondary battery negative electrode and a slurry composition for a secondary battery negative electrode), a negative electrode, a positive electrode, a separator, and a lithium ion secondary battery were prepared or produced in the same way as in Example 1 with the exception that a styrene-butadiene random copolymer produced as described below was used instead of a block copolymer in production of the binder composition for a secondary battery negative electrode as a composition for a functional layer. Evaluations were conducted in the same manner as in Example 1. The results are shown in Table 1.

<Production of Styrene-Butadiene Random Copolymer>

A reactor was charged with 150 parts of deionized water, 25 parts of sodium dodecylbenzenesulfonate aqueous solution (concentration: 10%) as an emulsifier, 36 parts of styrene as an aromatic vinyl monomer, 3 parts of itaconic acid as a carboxyl group-containing monomer, and 0.5 parts of t-dodecyl mercaptan as a molecular weight modifier in this order. Next, gas inside the reactor was purged with nitrogen three times, and then 61 parts of 1,3-butadiene was added into the reactor as an aliphatic conjugated diene monomer. The reactor was held at 60° C. while 0.5 parts of potassium persulfate was added as a polymerization initiator to initiate a polymerization reaction that was then continued under stirring. At the point at which the polymerization conversion rate reached 96%, cooling was performed and 0.1 parts of hydroquinone aqueous solution (concentration: 10%) was added as a polymerization inhibitor to terminate the polymerization reaction. Thereafter, residual monomer was removed using a rotary evaporator having a water temperature of 60° C. to obtain a water dispersion of a particulate polymer (polymer solution containing a styrene-butadiene random copolymer).

In Table 1, shown below:
"ST" indicates styrene unit;
"IP" indicates isoprene unit;
"BD" indicates 1,3-butadiene unit;
"Gr" indicates graphite; and
"$Al_2O_3$" indicates alumina (aluminum oxide).

TABLE 1

| Battery member including functional layer | | | | | Example 1 Negative electrode | Example 2 Negative electrode | Example 3 Negative electrode | Example 4 Negative electrode | Example 5 Negative electrode |
|---|---|---|---|---|---|---|---|---|---|
| Slurry compo- sition | Binder compo- sition | Block copolymer, etc. | | Structure | Block | Block | Block | Block | Block |
| | | | Aromatic vinyl monomer unit | Type | ST | ST | ST | ST | ST |
| | | | | Proportional Concent [mass %] | 25 | 25 | 25 | 25 | 25 |
| | | | Aliphatic conjugated diene monomer unit | Type | IP | IP | IP | IP | IP |
| | | | | Proportional Concent [mass %] | 75 | 75 | 75 | 75 | 75 |
| | | Non- conductive inorganic particles A | Overall (silica and talc) | D25/D75 [-] | 0.53 | 0.53 | 0.53 | 0.55 | 0.45 |
| | | | | Volume-average particle diameter [μm] | 15.2 | 15.4 | 14.6 | 17.7 | 5.1 |
| | | | | Amount per 100 parts by mass of block copolymer [parts by mass] | 0.20 | 1.15 | 0.08 | 0.20 | 0.20 |
| | | | Silica | D25/D75 [-] | 0.55 | 0.55 | 0.55 | 0.55 | — |
| | | | | Volume-average particle diameter [μm] | 17.7 | 17.7 | 17.7 | 17.7 | — |
| | | | | Amount per 100 parts by mass of block copolymer [parts by mass] | 0.16 | 0.94 | 0.06 | 0.2 | — |
| | | | Talc | D25/D75 [-] | 0.45 | 0.45 | 0.45 | — | 0.45 |
| | | | | Volume-average particle diameter [μm] | 5.1 | 5.1 | 5.1 | — | 5.1 |
| | | | | Amount per 100 parts by mass of block copolymer [parts by mass] | 0.04 | 0.21 | 0.02 | — | 0.2 |
| Electrode active material particles | | | | | Gr | Gr | Gr | Gr | Gr |
| Non-conductive inorganic particles B | | | | | — | — | — | — | — |
| Lithium ion acceptance at low temperatures | | | | | A | A | B | A | A |
| Inhibition of post-cycling swelling | | | | | A | B | A | A | A |

TABLE 1-continued

| Battery member including functional layer | | | | | Example 6 Negative electrode | Example 7 Negative electrode | Example 8 Separator | Comparative Example 1 Negative electrode | Comparative Example 2 Negative electrode |
|---|---|---|---|---|---|---|---|---|---|
| Slurry composition | Binder composition | Block copolymer, etc. | Aromatic vinyl monomer unit | Structure / Type | Block ST | Block ST | Block ST | Block ST | Random ST |
| | | | | Proportional Concent [mass %] | 25 | 25 | 25 | 25 | 36 |
| | | | Aliphatic conjugated diene monomer unit | Type | IP | IP | IP | IP | BD |
| | | | | Proportional Concent [mass %] | 75 | 75 | 75 | 75 | 61 |
| | | Non-conductive inorganic particles A | Overall (silica and talc) | D/25/D75 [-] | 0.38 | 0.49 | 0.53 | — | 0.53 |
| | | | | Volume-average particle diameter [μm] | 16.5 | 15.3 | 15.2 | — | 15.2 |
| | | | | Amount per 100 parts by mass of block copolymer [parts by mass] | 0.20 | 0.20 | 0.20 | — | 0.20 |
| | | | Silica | D25/D75 [-] | 0.36 | 0.55 | 0.55 | — | 0.55 |
| | | | | Volume-average particle diameter [μm] | 19.4 | 17.7 | 17.7 | — | 17.7 |
| | | | | Amount per 100 parts by mass of block copolymer [parts by mass] | 0.16 | 0.16 | 0.16 | — | 0.16 |
| | | | Talc | D25/D75 [-] | 0.45 | 0.25 | 0.45 | — | 0.45 |
| | | | | Volume-average particle diameter [μm] | 5.1 | 5.7 | 5.1 | — | 5.1 |
| | | | | Amount per 100 parts by mass of block copolymer [parts by mass] | 0.04 | 0.04 | 0.04 | — | 0.04 |
| | | Electrode active material particles | | | Gr | Gr | — | Gr | Gr |
| | | Non-conductive inorganic particles B | | | — | — | $Al_2O_3$ | — | — |
| | | Lithium ion acceptance at low temperatures | | | A | A | A | C | B |
| | | Inhibition of post-cycling swelling | | | B | B | A | B | C |

It can be seen from Table 1 that it was possible to inhibit post-cycling swelling of a secondary battery while also ensuring lithium ion (charge carrier) acceptance of the secondary battery at low temperatures in Examples 1 to 8 in which a functional layer (negative electrode mixed material layer or porous membrane layer) was formed using a composition for a functional layer that contained a specific block copolymer and non-conductive inorganic particles.

On the other hand, lithium ion acceptance of a secondary battery at low temperatures decreased in Comparative Example 1 in which a negative electrode mixed material layer was formed as a functional layer using a composition for a functional layer that contained a specific block copolymer but did not contain non-conductive inorganic particles.

Moreover, post-cycling swelling of a secondary battery could not be inhibited in Comparative Example 2 in which a negative electrode mixed material layer was formed as a functional layer using a composition for a functional layer that contained a styrene-butadiene random copolymer instead of a specific block copolymer.

INDUSTRIAL APPLICABILITY

According to the present disclosure, it is possible to provide a composition for a non-aqueous secondary battery functional layer capable of forming a functional layer that can both inhibit post-cycling swelling of a non-aqueous secondary battery and increase charge carrier acceptance of the non-aqueous secondary battery at low temperatures.

Moreover, according to the present disclosure, it is possible to provide a non-aqueous secondary battery member including a functional layer that can both inhibit post-cycling swelling of a non-aqueous secondary battery and increase charge carrier acceptance of the non-aqueous secondary battery at low temperatures.

Furthermore, according to the present disclosure, it is possible to provide a non-aqueous secondary battery in which post-cycling swelling is inhibited and that has excellent charge carrier acceptance at low temperatures.

The invention claimed is:

1. A composition for a non-aqueous secondary battery functional layer comprising:
    a block copolymer including a block region formed of an aromatic vinyl monomer unit and a block region formed of either or both of an aliphatic conjugated diene monomer unit having a carbon number of 5 or more and a hydrogenated aliphatic conjugated diene monomer unit having a carbon number of 5 or more;
    non-conductive inorganic particles; and
    a solvent,
    wherein the block copolymer has a coupling ratio of 60 mass % or more and 92 mass % or less,
    wherein the non-conductive inorganic particles include non-conductive inorganic particles A having a volume-average particle diameter of 1.0 μm or more, and
    wherein the composition comprises not less than 0.05 parts by mass and not more than 1.50 parts by mass of the non-conductive inorganic particles A per 100 parts by mass of the block copolymer.

2. The composition for a non-aqueous secondary battery functional layer according to claim 1, wherein proportional content of the aromatic vinyl monomer unit in the block copolymer is not less than 10 mass % and not more than 50 mass %.

3. The composition for a non-aqueous secondary battery functional layer according to claim 1, wherein the non-conductive inorganic particles A are either or both of silica and talc.

4. The composition for a non-aqueous secondary battery functional layer according to claim 3, wherein the silica has a D25/D75 of not less than 0.30 and not more than 1.00, where D25 and D75 are particle diameters respectively corresponding to cumulative volumes of 25% and 75% from a small particle end in a particle diameter distribution of the silica, and the silica has a volume-average particle diameter of not less than 16.0 μm and not more than 20.0 μm.

5. The composition for a non-aqueous secondary battery functional layer according to claim 3, wherein the talc has a D25/D75 of not less than 0.20 and not more than 1.00, where D25 and D75 are particle diameters respectively corresponding to cumulative volumes of 25% and 75% from a small particle end in a particle diameter distribution of the talc, and the talc has a volume-average particle diameter of not less than 4.0 μm and not more than 6.0 μm.

6. The composition for a non-aqueous secondary battery functional layer according to claim 1, further comprising electrode active material particles.

7. A non-aqueous secondary battery member comprising a functional layer for a non-aqueous secondary battery formed using the composition for a non-aqueous secondary battery functional layer according to claim 1.

8. A non-aqueous secondary battery comprising the non-aqueous secondary battery member according to claim 7.

9. A composition for a non-aqueous secondary battery functional layer comprising:
  a block copolymer including a block region formed of an aromatic vinyl monomer unit and a block region formed of either or both of an aliphatic conjugated diene monomer unit having a carbon number of 5 or more and a hydrogenated aliphatic conjugated diene monomer unit having a carbon number of 5 or more;
  non-conductive inorganic particles; and
  a solvent,
  wherein the block copolymer has a coupling ratio of 60 mass % or more and 92 mass % or less, and
  wherein the non-conductive inorganic particles include non-conductive inorganic particles A having a volume-average particle diameter of 1.0 μm or more and non-conductive inorganic particles B having a volume-average particle diameter of less than 1.0 μm.

10. The composition for a non-aqueous secondary battery functional layer according to claim 9, wherein proportional content of the aromatic vinyl monomer unit in the block copolymer is not less than 10 mass % and not more than 50 mass %.

11. The composition for a non-aqueous secondary battery functional layer according to claim 9, wherein the non-conductive inorganic particles A are either or both of silica and talc.

12. The composition for a non-aqueous secondary battery functional layer according to claim 11, wherein the silica has a D25/D75 of not less than 0.30 and not more than 1.00, where D25 and D75 are particle diameters respectively corresponding to cumulative volumes of 25% and 75% from a small particle end in a particle diameter distribution of the silica, and the silica has a volume-average particle diameter of not less than 16.0 μm and not more than 20.0 μm.

13. The composition for a non-aqueous secondary battery functional layer according to claim 11, wherein the talc has a D25/D75 of not less than 0.20 and not more than 1.00, where D25 and D75 are particle diameters respectively corresponding to cumulative volumes of 25% and 75% from a small particle end in a particle diameter distribution of the talc, and the talc has a volume-average particle diameter of not less than 4.0 μm and not more than 6.0 μm.

14. The composition for a non-aqueous secondary battery functional layer according to claim 9, comprising not less than 0.05 parts by mass and not more than 1.50 parts by mass of the non-conductive inorganic particles A per 100 parts by mass of the block copolymer.

15. The composition for a non-aqueous secondary battery functional layer according to claim 9, wherein the non-conductive inorganic particles B are at least one selected from the group consisting of alumina, boehmite, silicon oxide, magnesia, calcium oxide, titania, $BaTiO_3$, ZrO, alumina-silica complex oxide, aluminum nitride, boron nitride, silicon, diamond, barium sulfate, calcium fluoride, barium fluoride, and montmorillonite.

16. The composition for a non-aqueous secondary battery functional layer according to claim 9, further comprising electrode active material particles.

17. A non-aqueous secondary battery member comprising a functional layer for a non-aqueous secondary battery formed using the composition for a non-aqueous secondary battery functional layer according to claim 9.

18. A non-aqueous secondary battery comprising the non-aqueous secondary battery member according to claim 17.

* * * * *